US007133481B2

(12) United States Patent
Azakami et al.

(10) Patent No.: US 7,133,481 B2
(45) Date of Patent: Nov. 7, 2006

(54) SYNCHRONIZATION DETECTION APPARATUS

(75) Inventors: Hiroshi Azakami, Ibaraki (JP); Takaaki Konishi, Ibaraki (JP); Hisaya Kato, Soraku-gun (JP); Naoya Tokunaga, Moriguchi (JP); Kazuaki Suzuki, Kyoto (JP); Kazuya Ueda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 10/311,638

(22) PCT Filed: Apr. 5, 2002

(86) PCT No.: PCT/JP02/03415

§ 371 (c)(1),
(2), (4) Date: Dec. 18, 2002

(87) PCT Pub. No.: WO02/084937

PCT Pub. Date: Oct. 24, 2002

(65) Prior Publication Data

US 2003/0190002 A1    Oct. 9, 2003

(30) Foreign Application Priority Data

Apr. 9, 2001   (JP)   ............................. 2001-109607

(51) Int. Cl.
*H04L 7/00*   (2006.01)

(52) U.S. Cl. ...................... 375/355; 375/365; 375/368

(58) Field of Classification Search ................ 375/354, 375/355, 356, 357, 374, 365, 368
See application file for complete search history.

(56) References Cited

U.S. PATENT DOCUMENTS 5,400,369 A  *  3/1995  Ikemura ..................... 375/368

| 6,069,667 | A |   | 5/2000 | Ueda et al. |
| 6,104,770 | A | * | 8/2000 | Yama .......................... 375/368 |
| 6,310,570 | B1 |  | 10/2001 | Rumreich et al. |
| 6,603,830 | B1 | * | 8/2003 | Finsterbusch et al. ...... 375/362 |
| 6,980,617 | B1 | * | 12/2005 | Shimawaki ................. 375/368 |
| 2003/0190002 | A1 | * | 10/2003 | Azakami et al. ............ 375/368 |
| 2006/0056555 | A1 | * | 3/2006 | Oono et al. ................. 375/354 |

FOREIGN PATENT DOCUMENTS

| CN | 1216191 | 5/1999 |
| CN | 1 277 492 | 12/2000 |
| JP | 6-21936 | 1/1994 |
| JP | 6-29967 | 2/1994 |
| JP | 10-173617 | 6/1998 |
| JP | 10-224338 | 8/1998 |

(Continued)

*Primary Examiner*—Chieh M. Fan
*Assistant Examiner*—Jason M. Perilla
(74) *Attorney, Agent, or Firm*—Wenderoth, Lind & Ponack, L.L.P.

(57) ABSTRACT

An input signal DT contains a segment synchronization signal compliant with the ATSC standard. A clock multiplication section 111 multiplies a clock CK. A switchable sampling section 112 selects a sample point from among a plurality of timing points that are defined by the multiplied clock, and samples the input signal DT at the selected sample point. Moreover, the switchable sampling section 112 switches sample points from one to another in a synchronization-unestablished state. Once the segment synchronization is established, a synchronization detection device may maintain a synchronization-established state until the field synchronization detection fails, or the synchronization detection device may output a synchronization detection signal after shifting it in the time direction based on a bit error rate RT of the input signal.

13 Claims, 13 Drawing Sheets

FOREIGN PATENT DOCUMENTS

| | | |
|---|---|---|
| JP | 11-41223 | 2/1999 |
| JP | 2000-82975 | 3/2000 |
| JP | 2000-174829 | 6/2000 |
| JP | 2000-358011 | 12/2000 |

\* cited by examiner

F I G. 1
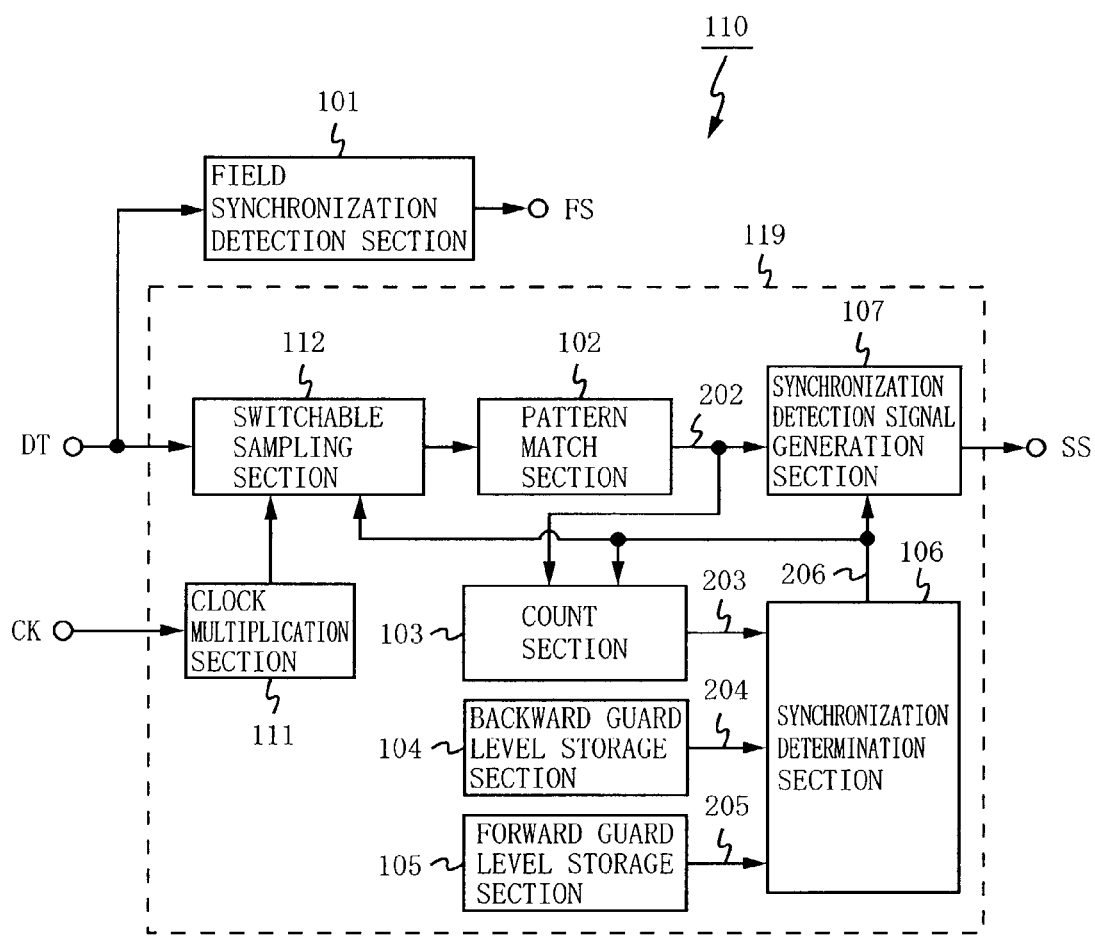

F I G. 1 0
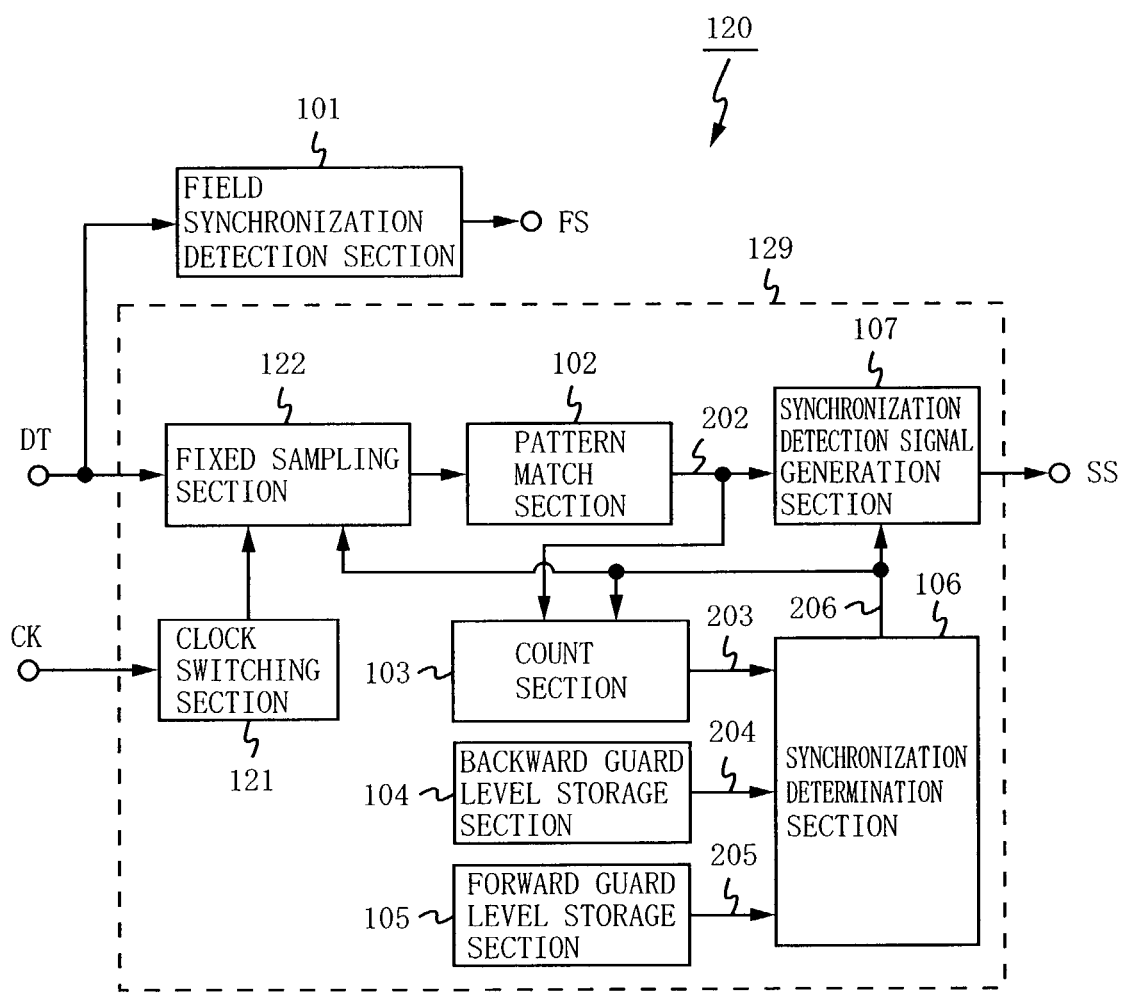

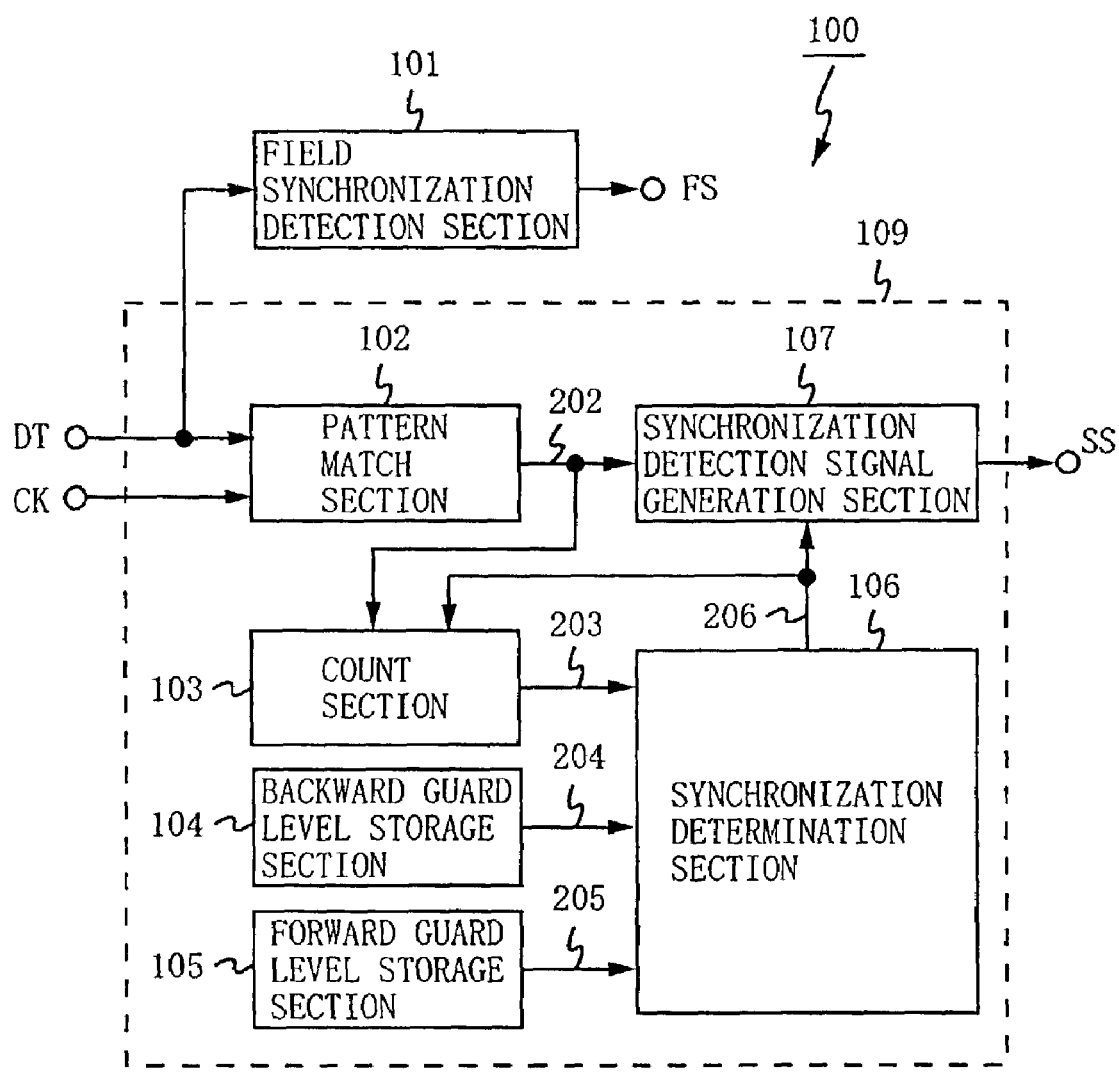
FIG. 15 - PRIOR ART

SYNCHRONIZATION DETECTION APPARATUS

TECHNICAL FIELD

The present invention relates to a synchronization detection device for detecting a synchronization signal from an input signal containing the synchronization signal, and more particularly to a synchronization detection device provided in a receiver that is compliant with the US digital terrestrial broadcasting standard, or the like.

BACKGROUND ART

FIG. 15 is a block diagram illustrating a configuration of a conventional synchronization detection device provided in a digital broadcast receiver. A synchronization detection device 100 illustrated in FIG. 15 includes a field synchronization detection section 101, a pattern match section 102, a count section 103, a backward guard level storage section 104, a forward guard level storage section 105, a synchronization determination section 106, and a synchronization detection signal generation section 107. The synchronization detection device 100 is provided in a digital demodulation system of a receiver compliant with the US digital terrestrial broadcasting standard. The VSB (Vestigial Side Band) scheme is employed as the modulation scheme for the digital demodulation system. The synchronization detection device 100 detects two kinds of synchronization signals (a field synchronization signal and a segment synchronization signal) from an input signal DT having a frame structure compliant with the ATSC (Advanced Television Systems Committee) standard, and outputs a field synchronization detection signal FS and a segment synchronization detection signal SS.

In FIG. 15, the field synchronization detection section 101 detects a field synchronization signal contained in the input signal DT, and outputs the field synchronization detection signal FS. Elements other than the field synchronization detection section 101 together form a segment synchronization detection section 109. The segment synchronization detection section 109 has a synchronization backward guard function and a synchronization forward guard function. The backward guard function refers to a function of transitioning from a synchronization-unestablished state to a synchronization-established state when a pattern match operation with a synchronization signal succeeds a predetermined number of times (referred to as "backward guard level") consecutively in a synchronization-unestablished state. The forward guard function refers to a function of transitioning from a synchronization-established state to a synchronization-unestablished state when a pattern match operation with a synchronization signal fails a predetermined number of times (referred to as "forward guard level") consecutively in a synchronization-established state.

The pattern match section 102 performs a pattern match operation between the input signal DT and the segment synchronization signal, and outputs a match result signal 202 indicating success or failure of the match operation. The count section 103 uses a counter provided therein to count the number of times a pattern match operation with the segment synchronization signal succeeds consecutively in a synchronization-unestablished state, and the number of times a pattern match operation with the segment synchronization signal fails consecutively in a synchronization-established state. The backward guard level storage section 104 stores a backward guard level 204 as described above, and the forward guard level storage section 105 stores a forward guard level 205 as described above.

The synchronization determination section 106 determines whether it is a synchronization-established state or a synchronization-unestablished state based on a count value 203 of the count section 103, the backward guard level 204 and the forward guard level 205. More specifically, the synchronization determination section 106 determines a transition to a synchronization-established state when the count value 203 becomes equal to or greater than the backward guard level 204 in a synchronization-unestablished state, and determines a transition to a synchronization-unestablished state when the count value 203 becomes equal to or greater than the forward guard level 205 in a synchronization-established state. A synchronization state signal 206 outputted from the synchronization determination section 106 is supplied to the count section 103 and the synchronization detection signal generation section 107.

The synchronization detection signal generation section 107 outputs the segment synchronization detection signal SS when it receives the match result signal 202 (whether it indicates a match success or a match failure) in a synchronization-established state.

However, a VSB demodulation system with the above-described conventional synchronization detection device provided therein has the following problems. When some object exists near the antenna of a digital broadcast transceiver, a VSB demodulation system receives both the original radio wave and a reflected wave that is reflected off the object, whereby the image is not displayed at all on the screen of the receiver. This phenomenon is called a "near-ghost". When the receiver receives a radio wave such that a near-ghost occurs, the segment synchronization pattern is disturbed (see FIG. 9) in the input signal to the VSB demodulation system. Therefore, a pattern match operation only for the upper one bit (sign bit) between the input signal and the segment synchronization signal may result in a failure to properly detect a synchronization signal or a detection of a synchronization signal at an erroneous timing.

Moreover, the segment synchronization detection signal SS outputted from the synchronization detection device is inputted to a waveform equalization section that is provided in a stage subsequent to the synchronization detection device. However, when the segment synchronization signal is detected at an erroneous timing, the waveform equalization section can only function to ensure a proper timing for the segment synchronization detection, and can no longer perform its primary function of removing a ghost caused by a transmission path.

Thus, it is an object of the present invention to provide a synchronization detection device having a desirable synchronization detecting capability and/or a desirable synchronization maintaining capability, and to provide a VSB demodulation system having a high near-ghost interference removing capability.

DISCLOSURE OF THE INVENTION

To achieve the above objects, the present invention has the following aspects.

A first aspect of the present invention is directed to a synchronization detection device for detecting a synchronization signal from an input signal containing the synchronization signal, comprising:

a sampling section that receives a clock signal and the input signal for sampling the input signal at one of a plurality of sample points that are present within one cycle of the clock signal;

a pattern match section for checking whether or not an output signal of the sampling section contains the same signal pattern as that of the synchronization signal with the same cycle as that of the synchronization signal;

a count section that receives a match result from the pattern match section for counting the number of times a pattern match operation succeeds consecutively in a synchronization-unestablished state and the number of times the pattern match operation fails consecutively in a synchronization-established state;

a backward guard level storage section for storing a synchronization backward guard level;

a forward guard level storage section for storing a synchronization forward guard level;

a synchronization determination section for determining whether or not it is a synchronization-established state based on the count value of the count section, the backward guard level and the forward guard level; and a synchronization detection signal generation section for generating a synchronization detection signal at a timing point at which the pattern match operation is performed by the pattern match section in a synchronization-established state, wherein the sampling section switches sample points for sampling the input signal from one to another in a synchronization-unestablished state.

According to the first aspect as described above, the sample points for sampling the input signal are switched from one to another in a synchronization-unestablished state, and the detection of the synchronization signal is performed for the sampled input signal. In this way, it is possible to detect the synchronization signal with a high precision. Moreover, by applying the synchronization detection device to a VSB demodulation system, it is possible to detect the segment synchronization signal with a high precision, and to improve the near-ghost interference removing capability.

In a second aspect based on the first aspect, the sampling section includes:

a clock multiplication section for multiplying the clock signal; and a switchable sampling section for sampling the input signal at a minimum interval at which the input signal changes by using the multiplied clock signal, while switching the sample points for sampling the input signal among a plurality of timing points defined by the multiplied clock signal in a synchronization-unestablished state.

According to the second aspect as described above, the clock signal is multiplied, and the input signal is sampled by using the multiplied clock signal. In this way, it is possible to set a large number of sample points at regular intervals within one cycle of the clock signal, and to improve the synchronization detecting capability.

In a third aspect based on the first aspect, the sampling section includes:

a clock switching section for selectively outputting a non-inverted signal of the clock signal or an inverted signal thereof, while switching signals to be output between the non-inverted signal of the clock signal and the inverted signal thereof in a synchronization-unestablished state; and a fixed sampling section for sampling the input signal at a minimum interval at which the input signal changes by using an output signal of the clock switching section.

According to the third aspect as described above, the input signal is sampled with the non-inverted signal of the clock signal or the inverted signal thereof. In this way, it is possible to improve the synchronization detecting capability with a simple configuration.

In a fourth aspect based on the first aspect, the input signal is data having a frame structure compliant with the ATSC standard, and the synchronization signal is a segment synchronization signal compliant with the ATSC standard.

According to the fourth aspect as described above, it is possible to detect the segment synchronization signal with a high precision, and to provide a VSB demodulation system having a high near-ghost interference removing capability.

In a fifth aspect based on the first aspect, quality information that indicates a quality of the input signal is supplied, so that if the quality of the input signal is higher than a predetermined reference, the synchronization detection device outputs the synchronization detection signal that is obtained by supplying the input signal, instead of the output signal of the sampling section, to the pattern match section.

According to the fifth aspect as described above, one of two kinds of segment synchronization detection signals is selectively output according to the quality of the input signal. In this way, it is possible to detect the synchronization signal with a high precision by using the sampled input when the quality of the input signal is low, while detecting the synchronization signal by using the input signal, as it is, when the quality of the input signal is high. Thus, it is possible to detect the synchronization signal according to the situation by switching the synchronization detecting methods according to the quality of the input signal. Moreover, by applying the synchronization detection device to a VSB demodulation system, it is possible to detect the segment synchronization signal with a high precision, and to improve the near-ghost interference removing capability.

In a sixth aspect based on the fifth aspect, the input signal is data having a frame structure compliant with the ATSC standard, the synchronization signal is a segment synchronization signal compliant with the ATSC standard, and the quality information indicates whether or not a near-ghost is occurring for the input signal.

According to the sixth aspect as described above, it is possible to detect the segment synchronization signal with a high precision, and to provide a VSB demodulation system having a high near-ghost interference removing capability.

A seventh aspect is a synchronization detection device for detecting a synchronization signal from an input signal containing the synchronization signal, comprising:

a pattern match section for checking whether or not the input signal contains the same signal pattern as that of the synchronization signal with the same cycle as that of the synchronization signal;

a count section that receives a match result from the pattern match section for counting the number of times a pattern match operation succeeds consecutively in a synchronization-unestablished state and the number of times the pattern match operation fails consecutively in a synchronization-established state;

a backward guard level storage section for storing a synchronization backward guard level;

a forward guard level storage section for storing a synchronization forward guard level;

a synchronization determination section for determining whether or not it is a synchronization-established state based on the count value of the count section, the backward guard level and the forward guard level; and a synchronization detection signal generation section for generating a synchronization detection signal at a timing point at which the pattern match operation is performed by the pattern match section in a synchronization-established state, a shift amount control section that receives quality information that indicates a quality of a result of processing the input signal using the synchronization detection signal for obtaining a shift amount of the synchronization detection signal based on the quality information; and a synchronization detection signal shifting section for shifting the synchronization detection signal in a time direction according to the shift amount obtained by the shift amount control section.

According to the seventh aspect as described above, the synchronization detection signal is outputted after being shifted in the time direction based on the quality information, and the shift amount of the synchronization detection signal is determined so as to improve the quality that is indicated by the quality information. In this way, it is possible to detect the segment synchronization signal with a high precision. Moreover, by applying the synchronization detection device to a VSB demodulation system, it is possible to detect the segment synchronization signal with a high precision, and to improve the near-ghost interference removing capability.

In an eighth aspect based on the seventh aspect, the shift amount control section changes the shift amount of the synchronization detection signal if the quality of the result of processing the input signal is lower than a predetermined reference.

In a ninth aspect based on the seventh aspect, the shift amount control section determines the shift amount of the synchronization detection signal so as to optimize the quality of the result of processing the input signal.

According to the eighth and ninth aspects as described above, the shift amount of the synchronization detection signal is determined so as to improve the quality that is indicated by the quality information. In this way, it is possible to detect the segment synchronization signal with a high precision.

In a tenth aspect based on the ninth aspect, the input signal is data having a frame structure compliant with the ATSC standard, and the synchronization signal is a segment synchronization signal compliant with the ATSC standard.

In an eleventh aspect based on the tenth aspect, the quality information is error rate information for a signal that is obtained by performing a waveform equalization operation on the input signal using the synchronization detection signal.

According to the tenth and eleventh aspects as described above, it is possible to detect the segment synchronization signal with a high precision, and to provide a VSB demodulation system having a high near-ghost interference removing capability.

A twelfth aspect is a synchronization detection device for detecting a synchronization signal from an input signal containing the synchronization signal, comprising:

a pattern match section for checking whether or not the input signal contains the same signal pattern as that of the synchronization signal with the same cycle as that of the synchronization signal;

a count section that receives a match result from the pattern match section for counting the number of times a pattern match operation succeeds consecutively in a synchronization-unestablished state;

a backward guard level storage section for storing a synchronization backward guard level;

a long cycle synchronization detection section for detecting a long cycle synchronization signal contained in the input signal with a cycle longer than the synchronization signal;

a synchronization determination section for determining a transition to a synchronization-established state when a count value of the count section becomes equal to or greater than the backward guard level and for determining a transition to a synchronization-unestablished state when a synchronization detection operation fails in the long cycle synchronization detection section; and a synchronization detection signal generation section for generating a synchronization detection signal at a timing point at which the pattern match operation is performed by the pattern match section in a synchronization-established state.

According to the twelfth aspect as described above, once the synchronization is established, the state where the synchronization is established is maintained unless the detection of the long cycle synchronization signal fails. In this way, it can be made unlikely for the segment synchronization, once established, to be lost. In other words, it is possible to improve the synchronization maintaining capability. Moreover, by applying the synchronization detection device to a VSB demodulation system, it is possible to improve the capability to maintain the segment synchronization signal, and to improve the near-ghost interference removing capability.

In a thirteenth aspect based on the twelfth aspect, the input signal is data having a frame structure compliant with the ATSC standard, the synchronization signal is a segment synchronization signal compliant with the ATSC standard, and the long cycle synchronization signal is a field synchronization signal compliant with the ATSC standard.

According to the thirteenth aspect as described above, the segment synchronization signal, once established, can be detected by being maintained, and it is possible to provide a VSB demodulation system having a high near-ghost interference removing capability.

BRIEF DESCRIPTION OF THE DRAWINGS

FIG. 1 is a block diagram illustrating a configuration of a synchronization detection device according to a first embodiment of the present invention.

FIG. 10 is a block diagram illustrating a configuration of a synchronization detection device according to the second embodiment of the present invention.

FIG. 15 is a block diagram illustrating a configuration of a conventional synchronization detection device.

Figure 2:
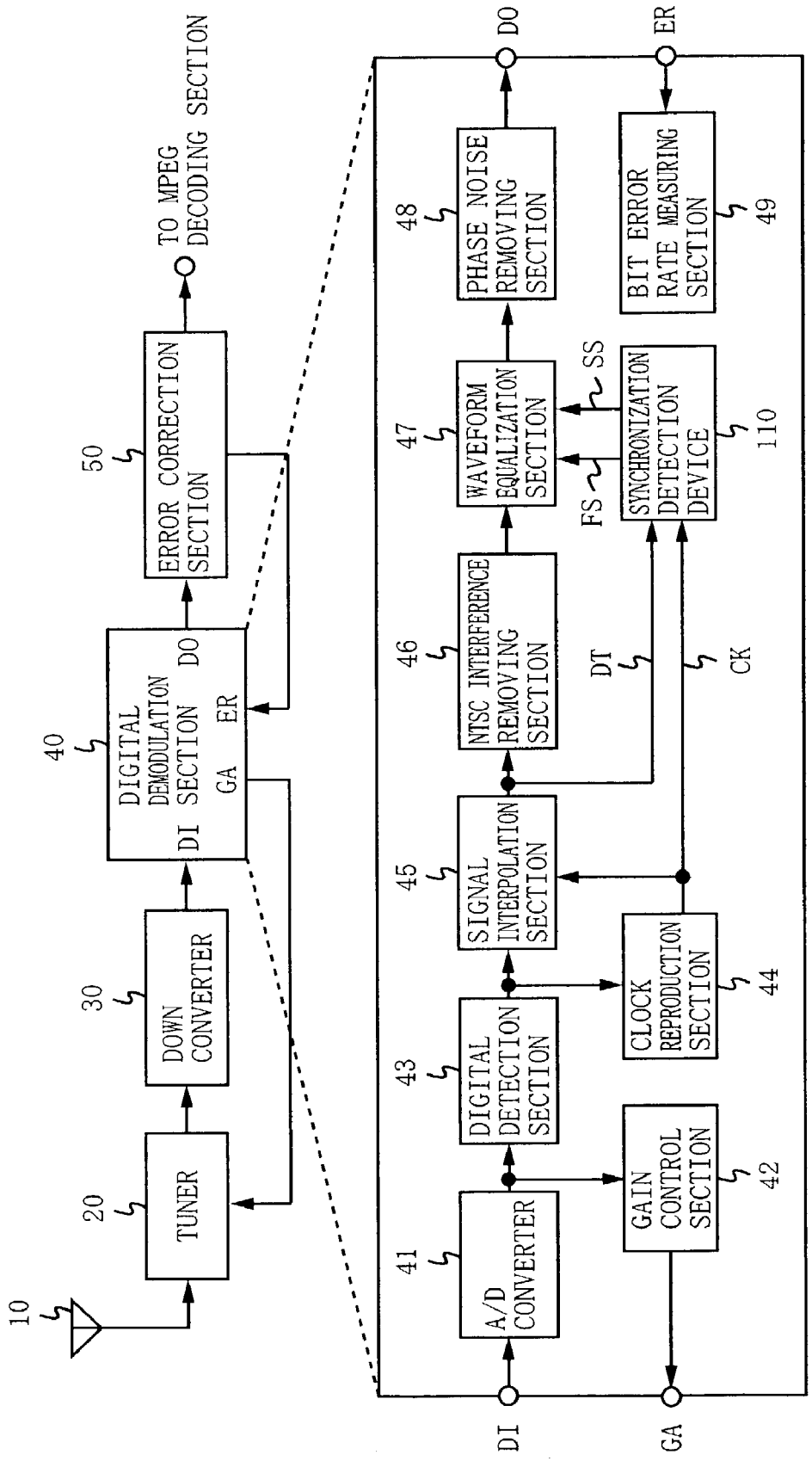
FIG. 2 is a block diagram illustrating a configuration of a VSB demodulation system with a synchronization detection device according to first to fifth embodiments of the present invention provided therein.

BEST MODE FOR CARRYING OUT THE INVENTION (First Embodiment)

FIG. 1 is a block diagram illustrating a configuration of a synchronization detection device according to the first embodiment of the present invention. A synchronization detection device 110 illustrated in FIG. 1 includes the field synchronization detection section 101, a clock multiplication section 111, a switchable sampling section 112, the pattern match section 102, the count section 103, the backward guard level storage section 104, the forward guard level storage section 105, the synchronization determination section 106, and the synchronization detection signal generation section 107. The synchronization detection device 110 is characterized in that it samples the input signal with a multiplied clock, and switches sample points for sampling the input signal from one to another in a synchronization-unestablished state, for detecting a segment synchronization signal.

Prior to describing the synchronization detection device 110, a digital demodulation system with this device provided therein will now be described. FIG. 2 is a block diagram illustrating a configuration of a VSB demodulation system with the synchronization detection device 110 provided therein. The VSB demodulation system illustrated in FIG. 2 includes a receiving antenna 10, a tuner 20, a down converter 30, a digital demodulation section 40, and an error correction section 50, and forms part of a receiver compliant with the ATSC standard, which is the US digital terrestrial broadcasting standard. Note that the US digital terrestrial broadcasting standard is described in detail in "ATSC Standard: Digital Television Standard, Revision B", Doc. A/B53, August 2001.

The elements of the VSB demodulation system operate as follows. The receiving antenna 10 receives a VSB-modulated terrestrial broadcasting radio wave. The tuner 20 selects a channel that the viewer wants to see. The down converter 30 converts the frequency of the output of the tuner 20 into a frequency band in which the digital demodulation section 40 can operate normally. The digital demodulation section 40 VSB-demodulates the output of the down converter 30. The error correction section 50 corrects an error that has occurred along the transmission path by using an error correcting code. The VSB-demodulated signal outputted from the error correction section 50 is converted into an audio-video signal by an MPEG decoding section (not shown).

The digital demodulation section 40 includes an A/D converter 41, a gain control section 42, a digital detection section 43, a clock reproduction section 44, a signal interpolation section 45, an NTSC interference removing section 46, the synchronization detection device 110, a waveform equalization section 47, a phase noise removing section 48, and a bit error rate measuring section 49. Among these elements, the synchronization detection device 110 is that illustrated in FIG. 1.

The elements of the digital demodulation section 40 operate as follows. The down converter 30, which is provided in a stage preceding the digital demodulation section 40, outputs a baseband VSB-modulated signal as an input signal DI. The A/D converter 41 converts the input signal DI into digital data. The gain control section 42 obtains a gain adjustment value GA based on the level of the digital data outputted from the A/D converter 41. The gain adjustment value GA is supplied to the tuner 20, and is used for adjusting the amplitude of signals received by the receiving antenna 10.

The digital detection section 43 extracts the baseband signal from the digital data outputted from the A/D converter 41, while removing frequency errors. The clock reproduction section 44 detects a phase shift in the sampling clock in the A/D converter 41 based on the signal detected by the digital detection section 43 to reproduce a clock. The reproduced clock is supplied to the signal interpolation section 45 and the synchronization detection device 110. The signal interpolation section 45 performs an upsampling operation on the signal detected by the digital detection section 43 by using the clock reproduced by the clock reproduction section 44. By this process, the signal detected by the digital detection section 43 is interpolated at a predetermined rate. The NTSC interference removing section 46 detects the level of an NTSC interference wave contained in the signal, which has been interpolated by the signal interpolation section 45, and removes the interference wave by using a filter provided therein.

The synchronization detection device 110 uses a clock CK supplied from the clock reproduction section 44 for detecting a field synchronization signal and a segment synchronization signal from the input signal DT, which has been interpolated by the signal interpolation section 45, to output the field synchronization detection signal FS and the segment synchronization detection signal SS. The two kinds of synchronization detection signals outputted from the synchronization detection device 110 are used as synchronization signals for the digital demodulation section 40 as a whole, and are also supplied to the waveform equalization section 47.

The waveform equalization section 47 detects a transmission path distortion contained in the output signal of the NTSC interference removing section 46, and removes the distortion. More specifically, the waveform equalization section 47 locates the field synchronization signal by using the two kinds of synchronization detection signals outputted from the synchronization detection device 110, and controls the coefficients of a filter provided therein according to a waveform equalization algorithm using the signal pattern of the field synchronization signal. In addition, the waveform equalization section 47 has a function of improving the waveform equalizing capability by using a signal pattern other than that of the field synchronization signal.

Figure 3:
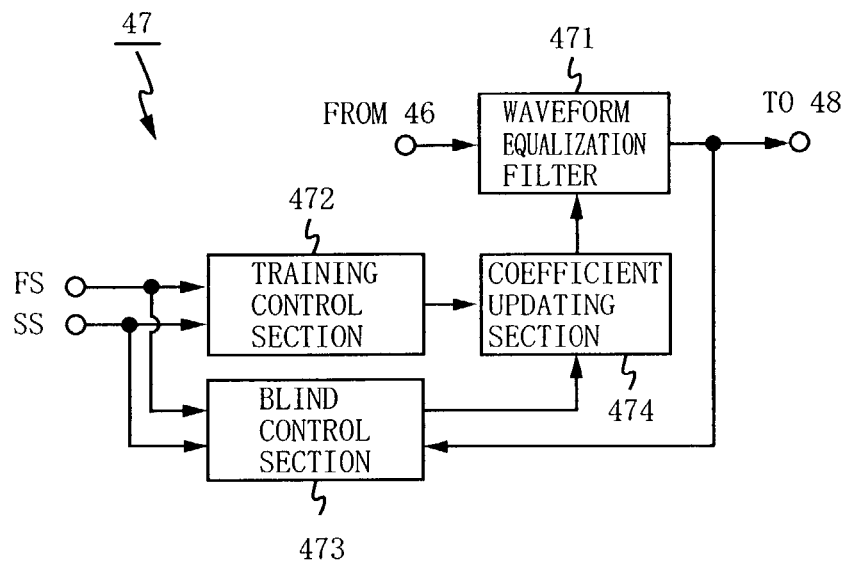
FIG. 3 is a block diagram illustrating a configuration of a waveform equalization section of the VSB demodulation system illustrated in FIG. 2.

FIG. 3 is a block diagram illustrating a detailed configuration of the waveform equalization section 47. The waveform equalization section 47 illustrated in FIG. 3 includes a waveform equalization filter 471, a training control section 472, a blind control section 473, and a coefficient updating section 474. The waveform equalization filter 471 is a digital filter for removing a ghost caused by a transmission path. The training control section 472 and the blind control section 473 each receive the two kinds of synchronization detection signals outputted from the synchronization detection device 110. The training control section 472 obtains tap coefficients of the waveform equalization filter 471 based on these synchronization detection signals according to a waveform equalization algorithm using the signal pattern of the field synchronization signal. The blind control section 473 obtains tap coefficients of the waveform equalization filter 471 according to a waveform equalization algorithm using a signal pattern other than that of the field synchronization signal. The coefficient updating section 474 sets the tap coefficients obtained by the training control section 472 or the tap coefficients obtained by the blind control section 473 in the waveform equalization filter 471.

As described above, the tap coefficients of the waveform equalization filter 471 are controlled according to the signal pattern of the field synchronization signal or a signal pattern other than that of the field synchronization signal so as to improve the waveform equalizing capability. In this way, the waveform equalization section 47 can remove a ghost caused by a transmission path that is contained in the output signal of the NTSC interference removing section 46.

The phase noise removing section 48 detects and removes a phase noise component contained in the output signal of the waveform equalization section 47. An output signal DO obtained by this process is outputted to the error correction section 50. When the error correction section 50 detects an error in the output signal DO, the error correction section 50 outputs an error detection signal ER indicating the error detection. The bit error rate measuring section 49 obtains the bit error rate of the output signal DO based on the error detection signal ER.

Figure 4:
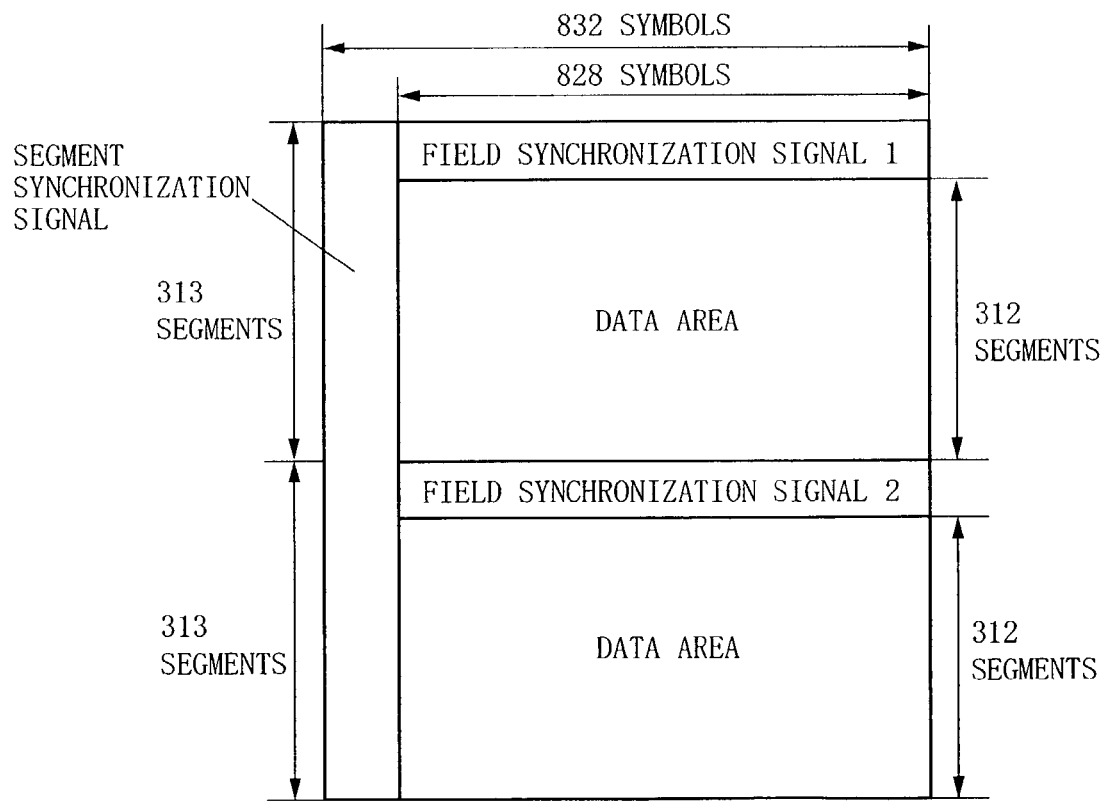
FIG. 4 is a diagram illustrating a format of data having a frame structure defined in the ATSC.

FIG. 4 is a diagram illustrating a format of data having a frame structure defined in the ATSC standard. As illustrated in FIG. 4, in data defined in the ATSC standard, one frame includes two fields, one field includes 313 segments, and one segment includes 832 symbols (symbol rate is about 10.76 MHz). A 4-symbol-long segment synchronization signal is provided at the beginning of each segment. Moreover, a 1-segment-long field synchronization signal is provided for every 313 segments. Data is transmitted or received by using symbols that are contained neither in the segment synchronization signal nor in the field synchronization signal.

Figure 5:
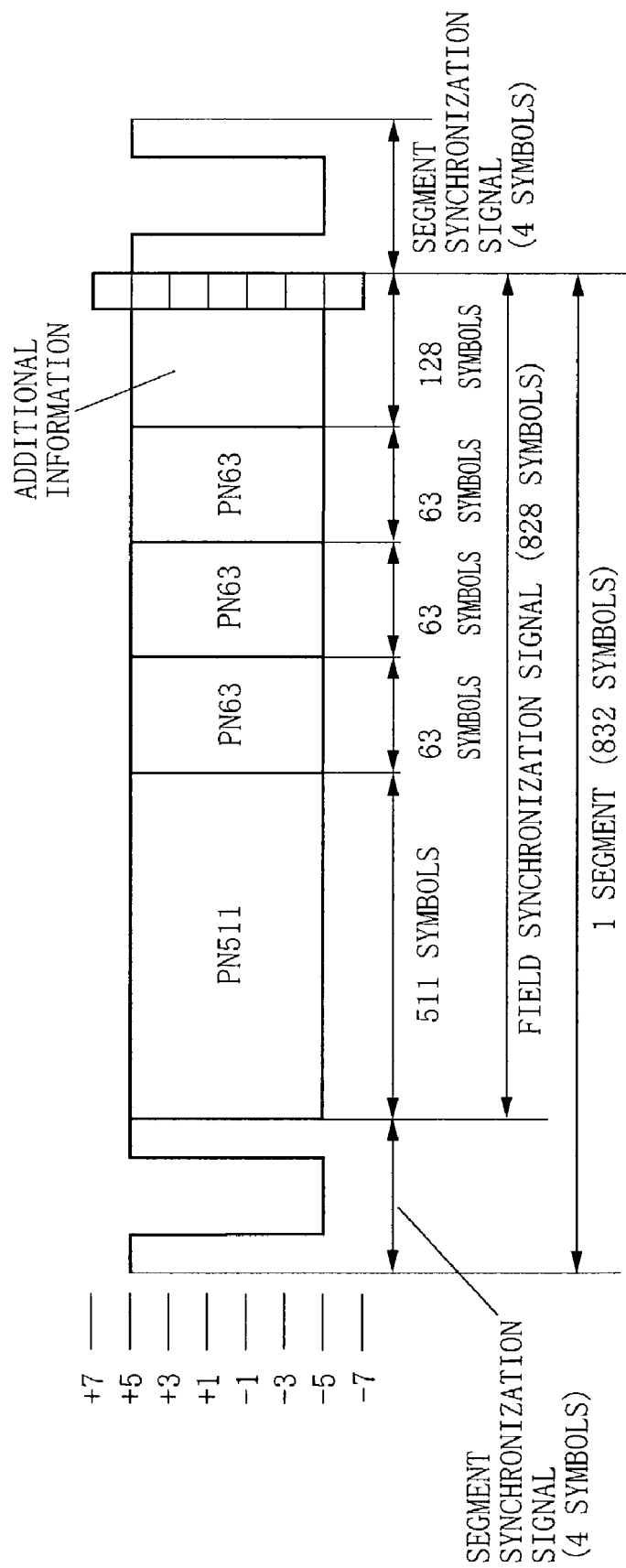
FIG. 5 is a diagram illustrating the details of a segment containing a field synchronization signal defined in the ATSC.
Figure 6:
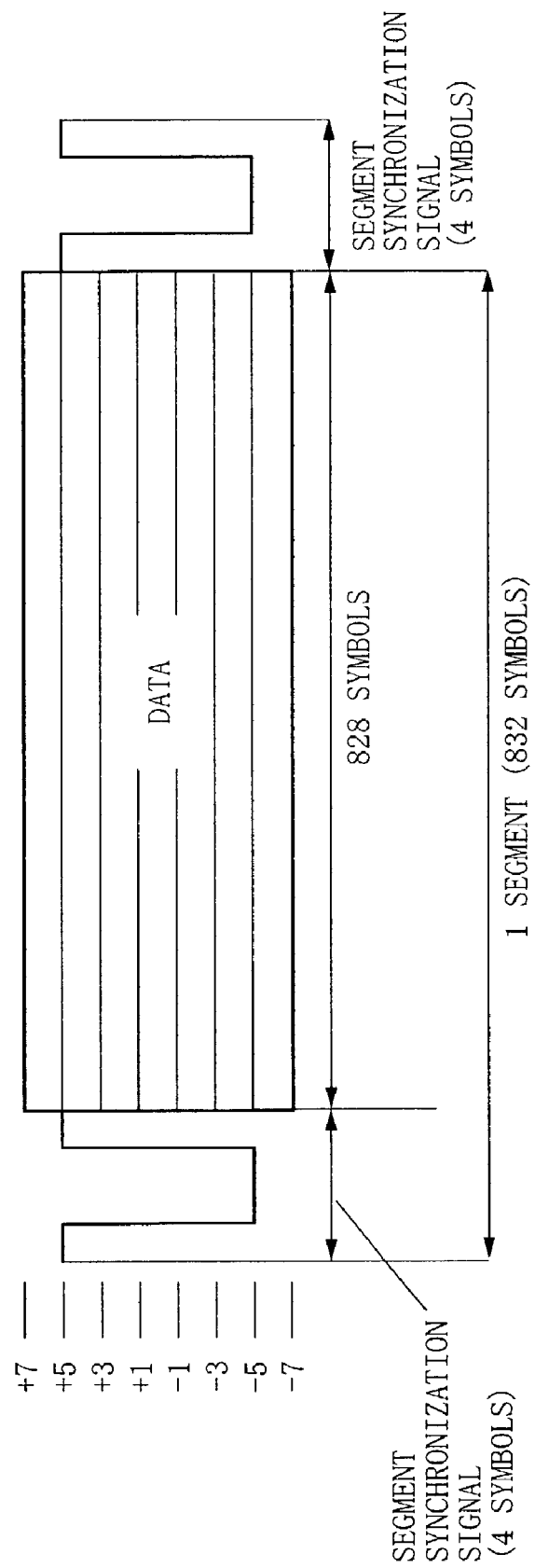
FIG. 6 is a diagram illustrating the details of a segment containing data defined in the ATSC.

FIG. 5 is a diagram illustrating the details of a segment containing the field synchronization signal. FIG. 6 is a diagram illustrating the details of a segment containing data. As illustrated in FIG. 5 and FIG. 6, in the 8-valued VSB scheme, the signal level of each symbol may take any of eight values of ±7, ±5, ±3 and ±1. Note however that the signal level of a symbol that is contained in the segment synchronization signal or the field synchronization signal (excluding the last 12 symbols) may only take one of two values of ±5. The signal levels of the four symbols contained in the segment synchronization signal are defined to be in the sequence of +5, −5, −5, +5 from the beginning, as illustrated in FIG. 5 and FIG. 6.

An operation of the synchronization detection device 110 will now be described with reference to FIG. 1. The field synchronization detection section 101 detects the field synchronization signal contained in the input signal DT, and outputs the field synchronization detection signal FS at the timing point at which the field synchronization signal is detected.

Elements other than the field synchronization detection section 101 together form a segment synchronization detection section 119. The segment synchronization detection section 119 has a synchronization backward guard function and a synchronization forward guard function, and additionally has a clock multiplication function and a sample-point-switchable sampling function. The pattern match section 102, the count section 103, the backward guard level storage section 104, the forward guard level storage section 105, the synchronization determination section 106 and the synchronization detection signal generation section 107 operate as those of the segment synchronization detection section 109 in the conventional synchronization detection device 100, except that the input signal to the pattern match section 102 is a signal that is outputted from the switchable sampling section 112.

The pattern match section 102 performs a pattern match operation between the output signal of the switchable sampling section 112 and the segment synchronization signal, and outputs the match result signal 202 indicating success or failure of the match operation. More specifically, the pattern match section 102 checks whether or not the output signal of the switchable sampling section 112 contains the same signal pattern as that of the segment synchronization signal with the same cycle as that of the segment synchronization signal, and outputs the match result signal 202 indicating the check result. The match result signal 202 is outputted with the same cycle as the segment synchronization signal.

While the signal pattern of the segment synchronization signal is ideally the sequence of +5, −5, −5, +5 from the beginning, it is rare for the segment synchronization signal contained in the input signal DT to take this ideal value. Therefore, it is not possible to perform a practical segment synchronization detection if a pattern match operation between the input signal DT and the segment synchronization signal is performed with eight levels (three bits). In view of this, the pattern match section 102 performs a pattern match operation only on the upper one bit (sign bit). Note that a pattern match operation may be performed on a number of upper bits depending on the application of the synchronization detection device 110.

The count section 103 includes a counter and a control circuit for the counter. The count section 103 uses a counter provided therein to count the number of times a pattern match operation with the segment synchronization signal succeeds consecutively, and the number of times it fails consecutively. More specifically, the count section 103 receives the match result signal 202 and the synchronization state signal 206, which is outputted from the synchronization determination section 106. The synchronization state signal 206 is a signal that indicates whether it is a synchronization-established state or a synchronization-unestablished state.

The count section 103 operates differently for each of the following four cases. First, when receiving the match result signal 202 indicating a match success in a synchronization-unestablished state, the count section 103 updates the counter by one. Second, when receiving the match result signal 202 indicating a match failure in a synchronization-unestablished state, the count section 103 initializes the counter. Third, when receiving the match result signal 202 indicating a match failure in a synchronization-established state, the count section 103 updates the counter by one.

Fourth, when receiving the match result signal 202 indicating a match success in a synchronization-established state, the count section 103 initializes the counter. Note that for counting the number of times of success and the number of times of failure, the count section 103 may include two counters, or one counter that can be switched between different modes for the two purposes.

The backward guard level storage section 104 stores the backward guard level 204 (i.e., the number of times a pattern match operation with a synchronization signal needs to succeed consecutively for a transition from a synchronization-unestablished state to a synchronization-established state). The forward guard level storage section 105 stores the forward guard level 205 (i.e., the number of times a pattern match operation with a synchronization signal needs to fail consecutively for a transition from a synchronization-established state to a synchronization-unestablished state). The guard levels stored in these storage sections may be either variable or fixed. If a guard level is variable, the storage section is a memory circuit, whereas if a guard level is fixed, the storage section is a circuit that outputs a fixed value. If the backward guard level 204 and the forward guard level 205 are the same value, the two storage sections may be a single circuit.

The synchronization determination section 106 receives the count value 203 of the count section 103, the backward guard level 204 stored in the backward guard level storage section 104, and the forward guard level 205 stored in the forward guard level storage section 105. The synchronization determination section 106 determines whether it is a synchronization-established state or a synchronization-unestablished state based on these inputs, and outputs the synchronization state signal 206 indicating the determination result. More specifically, the synchronization determination section 106 determines the initial state to be a synchronization-unestablished state. The synchronization determination section 106 determines a transition to a synchronization-established state when the count value 203 becomes equal to or greater than the backward guard level 204 in a synchronization-unestablished state. Moreover, the synchronization determination section 106 determines a transition to a synchronization-unestablished state when the count value 203 becomes equal to or greater than the forward guard level 205 in a synchronization-established state.

The synchronization detection signal generation section 107 receives the match result signal 202 and the synchronization state signal 206. The synchronization detection signal generation section 107 outputs the segment synchronization detection signal SS when it receives the match result signal 202 in a synchronization-established state. Note that in a synchronization-established state, the synchronization detection signal generation section 107 outputs the segment synchronization detection signal SS of course when it receives the match result signal 202 indicating a match success, but also when it receives the match result signal 202 indicating a match failure. Moreover, the segment synchronization detection signal SS may be, for example, a signal that is held at the value 0 (or value 1) for a 1-symbol-long period of time at the timing point at which the beginning of the segment synchronization signal is detected, or a signal that is held at the value 0 (or value 1) for a 4-symbol-long period of time corresponding to the length of the segment synchronization signal.

In the synchronization detection device 110, although the input signal DT is inputted in synchronization with the clock CK, the synchronization may be shifted forward or backward depending on the condition of the input signal DT. Moreover, the cycle of the clock CK is the same as the cycle of the input signal DT or is an integer multiple thereof (two-fold, four-fold, etc.). In consideration of the temporal relationship between the clock CK and the input signal DT as described above, it is necessary to provide some mechanism in order to properly detect the segment synchronization signal.

In view of this, the synchronization detection device 110 includes, as its characteristic elements, the clock multiplication section 111 and the switchable sampling section 112. The clock CK reproduced by the clock reproduction section 44 is supplied to the clock multiplication section 111. The clock multiplication section 111 multiplies the clock CK by an integer of two or more. The multiplied clock is supplied to the switchable sampling section 112.

The switchable sampling section 112 samples the input signal DT using the multiplied clock. In this process, the switchable sampling section 112 switches the sample points for sampling the input signal DT from one to another while the synchronization state signal 206 is indicating a synchronization-unestablished state. The details of this process are as follows.

Figure 7:
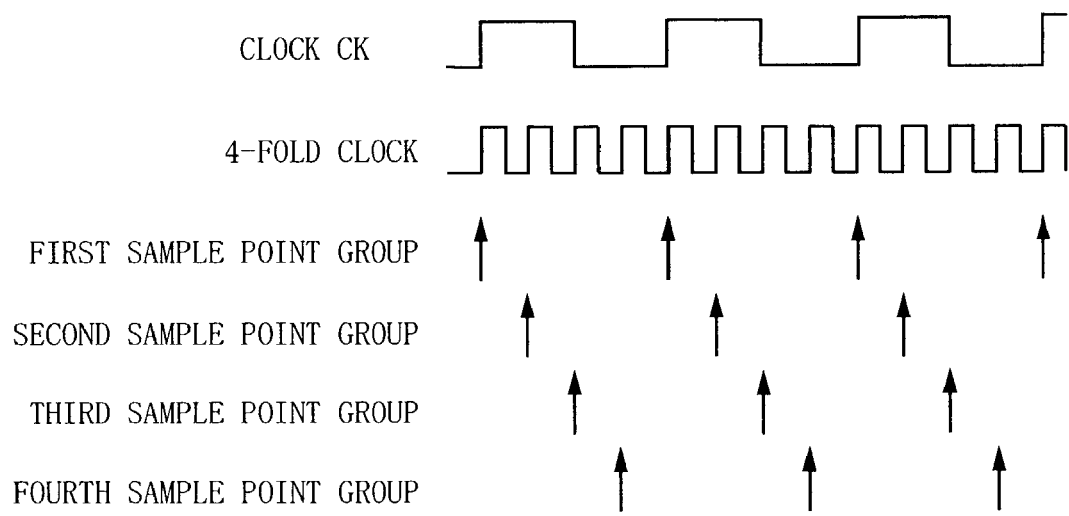
FIG. 7 is a diagram illustrating sample point groups of the synchronization detection device according to the first embodiment of the present invention.

Assume the cycle of the clock CK is T, the clock multiplication section 111 multiplies the clock CK by N, and the switchable sampling section 112 samples the input signal DT at the rising edge of the multiplied clock. With the time point of a rising edge of the multiplied clock being a reference, a group of time points that are each spaced apart from that time point by an integer multiple of the cycle T is defined as a first sample point group. Next, a group of time points that are delayed by time T/N from the respective time points included in the first sample point group is defined as a second sample point group. Next, a group of time points that are delayed by time T/N further from the respective time points included in the second sample point group is defined as a third sample point group. Similarly, fourth to $N^{th}$ sample point groups are defined (see FIG. 7).

The switchable sampling section 112 selects one of the first to $N^{th}$ sample point groups, and samples the input signal DT at the time points included in the selected sample point group. The switchable sampling section 112 switches the selection of a sample point group to another at intervals of a predetermined time S while the synchronization state signal 206 is indicating a synchronization-unestablished state. For example, if the synchronization state signal 206 does not change to a synchronization-established state after the passage of the predetermined time S with the first sample point group being selected, the switchable sampling section 112 selects the second sample point group. Then, if the synchronization state signal 206 does not change to a synchronization-established state after the passage of another predetermined time S, the switchable sampling section 112 selects the third sample point group. Similarly, if the synchronization state signal 206 does not change to a synchronization-established state after the passage of the predetermined time S, the switchable sampling section 112 sequentially selects the fourth to $N^{th}$ sample point groups, and thereafter repeats selecting the first to $N^{th}$ sample point groups sequentially. A period of time that is longer than a one-segment period multiplied by the backward guard level 204 is used as the time S.

The sequence in which the sample point groups are selected by the switchable sampling section 112 is arbitrary. For example, when the clock multiplication section 111 multiplies the clock CK eight-fold, the switchable sampling section 112 may sequentially select the first to eighth sample point groups, as in the example described above. Alternatively, the switchable sampling section 112 may select, as the next sample point group, a sample point group that is temporarily distant from the currently-selected sample point group to give a sequence such as first, fifth, third, seventh, second, sixth, fourth, eighth.

Figure 8:
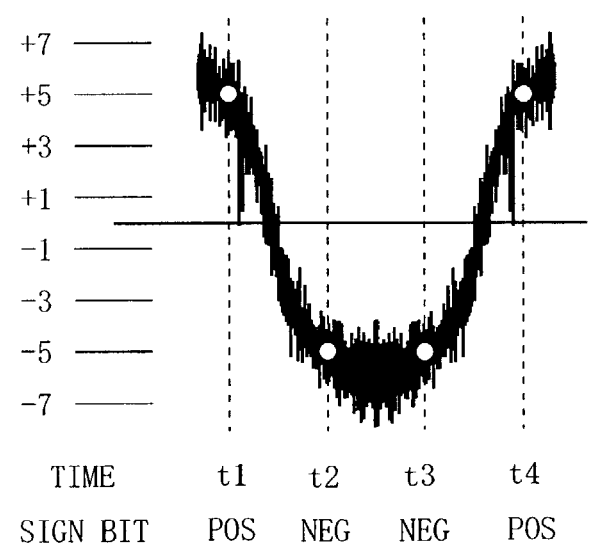
FIG. 8 is a diagram illustrating an example of a segment synchronization signal that is inputted to a synchronization detection device.

Effects of the synchronization detection device 110 will be described with reference to FIG. 8 and FIG. 9. FIG. 8 is a diagram illustrating an example of a segment synchronization signal that is inputted to the synchronization detection device 110. An open circle in FIG. 8 denotes a digital value of the signal amplitude when the input signal DT is sampled with a proper clock. These ideal values of the four symbols are in the sequence of +5, −5, −5, +5 from the beginning. When a segment synchronization signal having such a signal pattern is input, the segment synchronization signal can be detected properly even with a conventional synchronization detection device.

However, it is generally rare that a segment synchronization signal having an ideal signal pattern is input, for reasons such as a distortion caused by a transmission path, a frequency error of the tuner, and thermal noise. For example, as illustrated in FIG. 9, in a case where a ghost wave (broken line) that is delayed by ¼ cycle from an ideal wave (solid line) is present, the synchronization detection device 110 receives a combined wave (thick line) having a larger amplitude than that of the ideal wave and a delayed phase therefrom.

It is assumed below that the synchronization detection device 110 multiplies the clock CK two-fold and samples the input signal DT at the rising edge of the two-fold clock. Moreover, for the clock obtained by multiplying the clock CK two-fold, a group of time points corresponding to the rising edges of the clock CK is defined as a first sample point group, and a group of time points corresponding to the falling edges of the clock CK is defined as a second sample point group.

Figure 9:
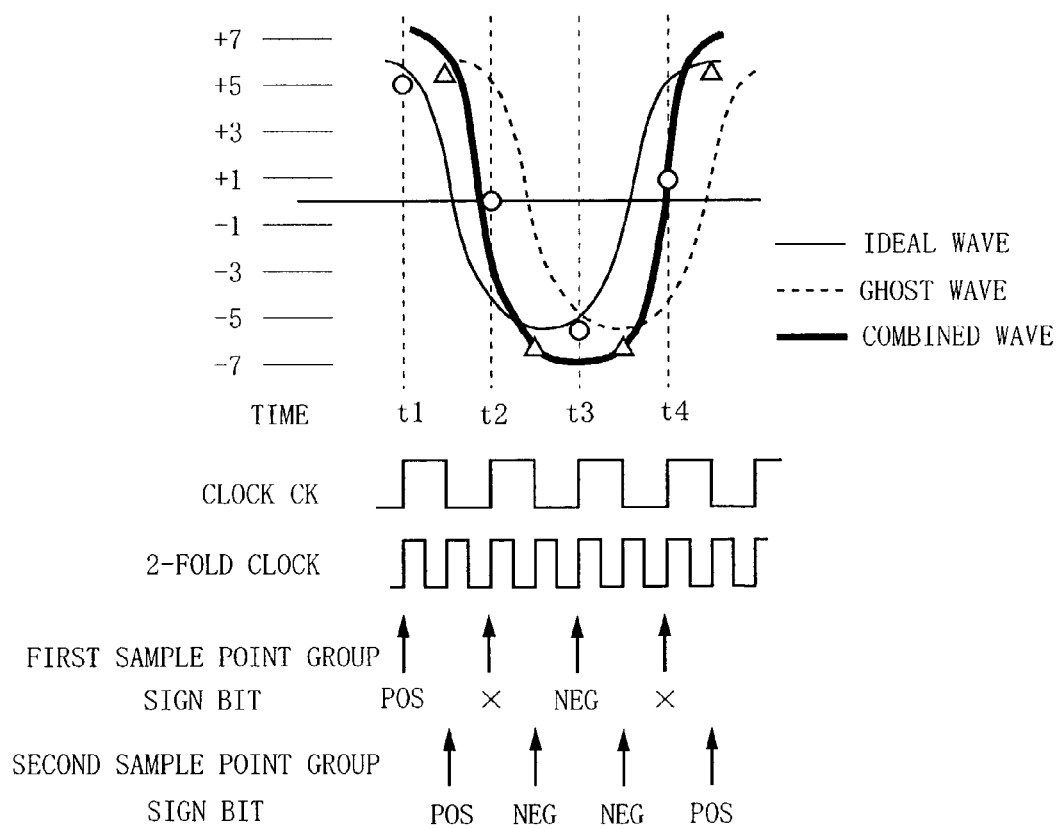
FIG. 9 is a diagram illustrating how a segment synchronization is detected by the synchronization detection device according to the first embodiment of the present invention.

When the combined wave illustrated in FIG. 9 is sampled at the time points included in the first sample point group, the upper one bits (sign bits) of the samples are in the sequence of pos, x, neg, x from the beginning. Note that the symbol x represents a state where the signal amplitude is close to zero and cannot be determined to be either positive or negative. On the other hand, when the same combined wave is sampled at the time points included in the second sample point group, the sign bits are in the sequence of pos, neg, neg, pos from the beginning. Moreover, since the signal pattern of the segment synchronization signal is the sequence of +5, −5, −5, +5 from the beginning, the sign bits of this pattern are in the sequence of pos, neg, neg, pos from the beginning.

Therefore, when the combined wave illustrated in FIG. 9 is input, it is not possible to detect the segment synchronization signal by sampling the combined wave at the rising edge of the original clock CK, but it is possible to properly detect the segment synchronization signal by sampling the input signal at one of the rising edges of the two-fold clock.

As described above, the synchronization detection device 110 has a clock multiplication function and a sample-point-switchable sampling function. Therefore, if the synchronization detection device 110 fails to detect the segment synchronization signal by using the first sample point group, it switches the sample points to the second sample point group to detect the segment synchronization signal. Thus, with the synchronization detection device 110, it is possible to detect the segment synchronization signal with a high precision even when receiving a signal such that a near-ghost occurs.

As illustrated above, the synchronization detection device according to the present embodiment is characterized in that it multiplies the clock signal, samples the input signal with the multiplied clock, and switches the sampling points for sampling the input signal from one to another in a synchronization-unestablished state. Therefore, with the synchronization detection device, it is possible to detect the segment synchronization signal with a high precision. Moreover, by using the synchronization detection device, it is possible to provide a VSB demodulation system having a high near-ghost interference removing capability.

(Second Embodiment)

FIG. 10 is a block diagram illustrating a configuration of a synchronization detection device according to the second embodiment of the present invention. A synchronization detection device 120 illustrated in FIG. 10 includes the field synchronization detection section 101, a clock switching section 121, a fixed sampling section 122, the pattern match section 102, the count section 103, the backward guard level storage section 104, the forward guard level storage section 105, the synchronization determination section 106, and the synchronization detection signal generation section 107. The synchronization detection device 120 is characterized in that it selects one of a non-inverted signal of a clock and an inverted signal thereof, and samples an input signal by using the selected signal, for detecting a segment synchronization signal. Elements of the present embodiment that are the same as those of the first embodiment are denoted by the same reference numerals and will not be described below.

The synchronization detection device 120 is provided in a VSB demodulation system, as is the synchronization detection device 110 according to the first embodiment. Thus, the synchronization detection device 120 is used in place of the synchronization detection device 110 in the VSB demodulation system illustrated in FIG. 2.

In FIG. 10, elements other than the field synchronization detection section 101 together form a segment synchronization detection section 129. The clock switching section 121 and the fixed sampling section 122 are elements that are characteristic of the synchronization detection device 120.

The clock CK reproduced by the clock reproduction section 44 is supplied to the clock switching section 121. The clock switching section 121 selectively outputs one of the non-inverted signal of the clock CK and the inverted signal thereof based on the synchronization state signal 206. The fixed sampling section 122 samples the input signal DT by using the output signal of the clock switching section 121.

The clock switching method of the clock switching section 121 is similar to the sample point switching method of the synchronization detection device 110 according to the first embodiment. Specifically, if the synchronization state signal 206 does not change to a synchronization-established state after the passage of the predetermined time S while the clock switching section 121 is outputting the non-inverted signal of the clock CK, the clock switching section 121 switches the signal to be outputted to the inverted signal of the clock CK. Moreover, if the synchronization state signal 206 does not change to a synchronization-established state after the passage of the predetermined time S while the clock switching section 121 is outputting the inverted signal of the clock CK, the clock switching section 121 switches the signal to be outputted to the non-inverted signal of the clock CK.

Figure 11:
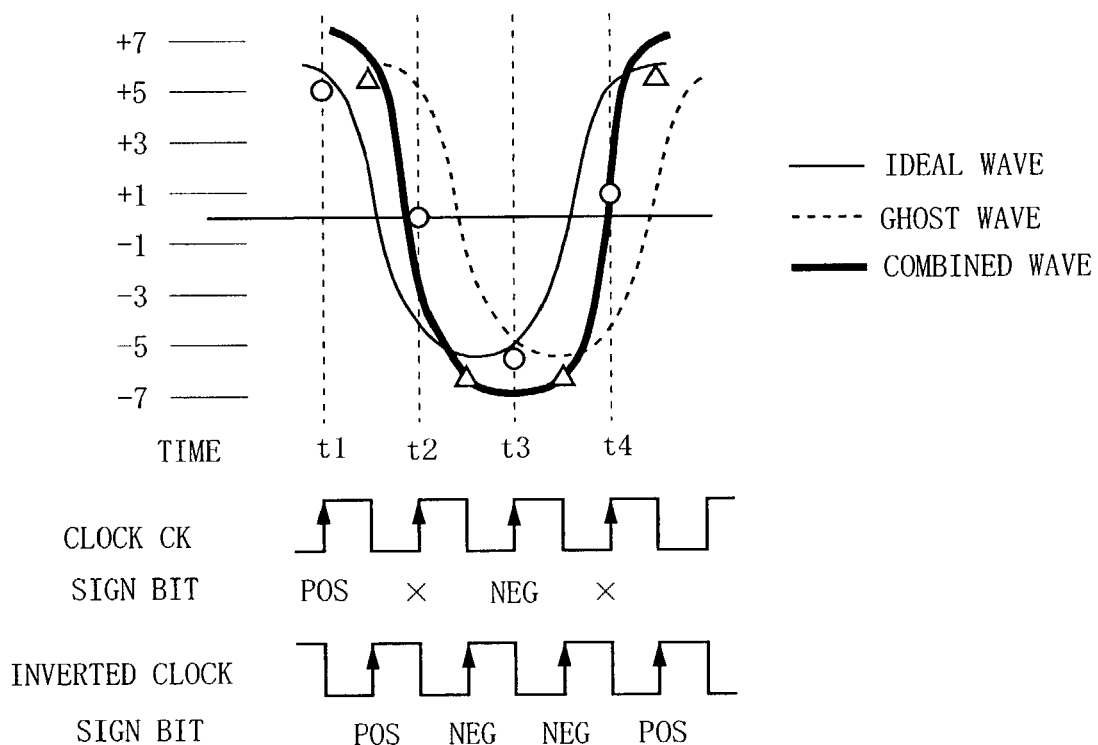
FIG. 11 is a diagram illustrating how a segment synchronization is detected by the synchronization detection device according to the second embodiment of the present invention.

The effects of the synchronization detection device 120 are the same as those of the synchronization detection device 110 according to the first embodiment. FIG. 11 again illustrates the same segment synchronization signal as that illustrated in FIG. 9. Compare FIG. 9 with FIG. 11, and associate the group of time points at the rising edges of the non-inverted signal of the clock CK with the first sample point group, and the group of time points at the rising edges of the inverted signal of the clock CK with the second sample point group. This readily leads to a conclusion that the synchronization detection device 120 can detect the segment synchronization signal from the combined wave illustrated in FIG. 11.

As illustrated above, the synchronization detection device according to the present embodiment is characterized in that it selects one of the non-inverted signal of the clock and the inverted signal thereof, and samples the input signal by using the selected signal. Therefore, with the synchronization detection device, it is possible to detect the segment synchronization signal with a high precision. Moreover, by using the synchronization detection device, it is possible to provide a VSB demodulation system having a high near-ghost interference removing capability.

(Third Embodiment)

Figure 12:
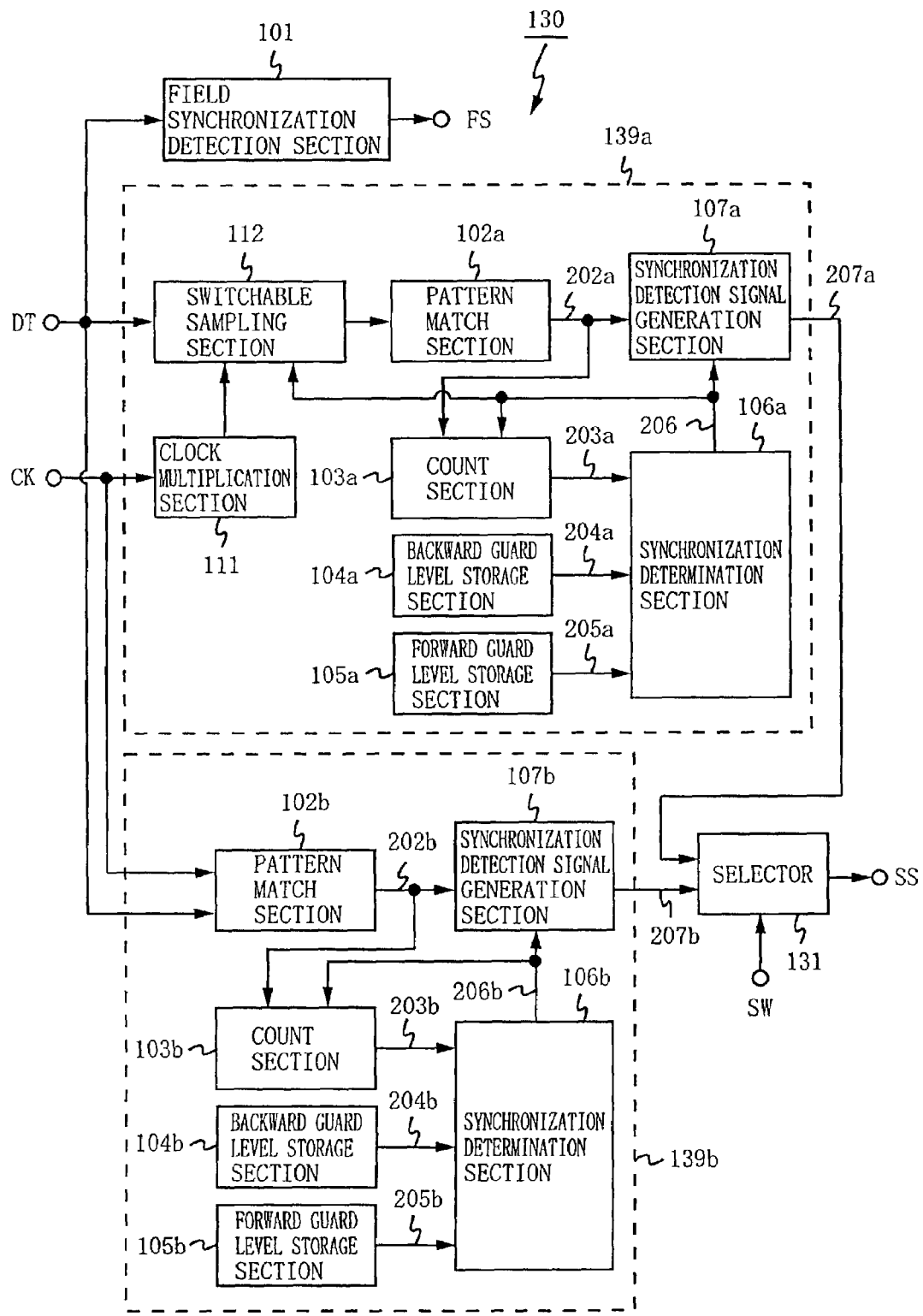
FIG. 12 is a block diagram illustrating a configuration of a synchronization detection device according to the third embodiment of the present invention.

FIG. 12 is a block diagram illustrating a configuration of a synchronization detection device according to the third embodiment of the present invention. A synchronization detection device 130 illustrated in FIG. 12 includes the field synchronization detection section 101, a first segment synchronization detection section 139a, a second segment synchronization detection section 139b, and a selector 131. The synchronization detection device 130 is characterized in that it includes two kinds of segment synchronization detection sections, and selectively outputs one of two kinds of segment synchronization detection signals according to whether or not a near-ghost is occurring. Elements of the present embodiment that are the same as those of the first embodiment are denoted by the same reference numerals and will not be described below.

The synchronization detection device 130 is provided in a VSB demodulation system, as is the synchronization detection device 110 according to the first embodiment. Thus, the synchronization detection device 130 is used in place of the synchronization detection device 110 in the VSB demodulation system illustrated in FIG. 2. Note however that in the present embodiment, a switch signal SW that indicates whether or not a near-ghost is occurring for the input signal is supplied from the waveform equalization section 47 to the synchronization detection device 130. The switch signal SW is an example of quality information that indicates the quality of the input signal DT.

The first segment synchronization detection section 139a includes the clock multiplication section 111, the switchable sampling section 112, a pattern match section 102a, a count section 103a, a backward guard level storage section 104a, a forward guard level storage section 105a, a synchronization determination section 106a, and a synchronization detection signal generation section 107a. The first segment synchronization detection section 139a performs the same operation as the segment synchronization detection section 119 of the synchronization detection device 110 according to the first embodiment to output a first segment synchronization detection signal 207a.

The second segment synchronization detection section 139b includes a pattern match section 102b, a count section 103b, a backward guard level storage section 104b, a forward guard level storage section 105b, a synchronization determination section 106b, and a synchronization detection signal generation section 107b. The second segment synchronization detection section 139b performs the same operation as the segment synchronization detection section 109 of the conventional synchronization detection device 100 to output a second segment synchronization detection signal 207b.

The selector 131 receives the first segment synchronization detection signal 207a, the second segment synchronization detection signal 207b, and the switch signal SW. The selector 131 selects a signal to be output for each of the following two cases.

When the waveform equalization section 47 detects the occurrence of a near-ghost, the waveform equalization section 47 outputs the switch signal SW that indicates the occurrence of a near-ghost. In this case, the selector 131 outputs the first segment synchronization detection signal 239a as the segment synchronization detection signal SS. Therefore, the waveform equalization section 47 locates the field synchronization signal with reference to the segment synchronization detection signal detected by the synchronization detection device 110 according to the first embodiment, and improves the waveform equalizing capability according to a waveform equalization algorithm using the signal pattern of the field synchronization signal.

On the other hand, when the waveform equalization section 47 does not detect the occurrence of a near-ghost, the waveform equalization section 47 outputs the switch signal SW that indicates absence of a near-ghost. In this case, the selector 131 outputs the second segment synchronization detection signal 239b as the segment synchronization detection signal SS. Therefore, the waveform equalization section 47 locates the field synchronization signal with reference to the segment synchronization detection signal detected by the conventional synchronization detection device 100, and improves the waveform equalizing capability according to a waveform equalization algorithm using the signal pattern of the field synchronization signal.

As illustrated above, the synchronization detection device according to the present embodiment is characterized in that it selectively outputs one of two kinds of segment synchronization detection signals according to whether or not a near-ghost is occurring. Therefore, with the synchronization detection device, it is possible to detect the segment synchronization signal with a high precision by using a multiplied clock when a near-ghost is occurring, and to detect the segment synchronization signal by the conventional method when a near-ghost is not occurring. Thus, it is possible to detect the segment synchronization signal according to the situation by switching the synchronization detecting methods according to whether or not a near-ghost is occurring. Moreover, by using the synchronization detection device, it is possible to provide a VSB demodulation system having a high near-ghost interference removing capability.

Note that while the segment synchronization detection section 119 of the synchronization detection device 110 according to the first embodiment is used as the first segment synchronization detection section 139a in the synchronization detection device 130, the segment synchronization detection section 129 of the synchronization detection device 120 according to the second embodiment may alternatively be used.

Moreover, while two kinds of segment synchronization detection sections are provided in the synchronization detection device 130, one segment synchronization detection section having two functions that can be switched by the switch signal SW may alternatively be provided. Specifically, the following three variations are possible. A first variation is a synchronization detection device based on the synchronization detection device 110 according to the first embodiment, wherein the switchable sampling section 112 does not switch sample points when a near-ghost is not occurring. A second variation is a synchronization detection device based on the synchronization detection device 120 according to the second embodiment, wherein the clock switching section 121 does not switch signals to be output when a near-ghost is not occurring. A third variation is a synchronization detection device based on the synchronization detection device 110, 120 according to the first or second embodiment, wherein a selector is provided for switching the input signal for the pattern match section 102 between the output signal from the preceding stage and the input signal DT according to the switch signal SW.

The synchronization detection devices according to these variations all output the same segment synchronization detection signal as that when the input signal DT is supplied to the pattern match section 102, if a near-ghost is not occurring. Therefore, these synchronization detection devices provide the same effects as those of the synchronization detection device 130.

(Fourth Embodiment)

Figure 13:
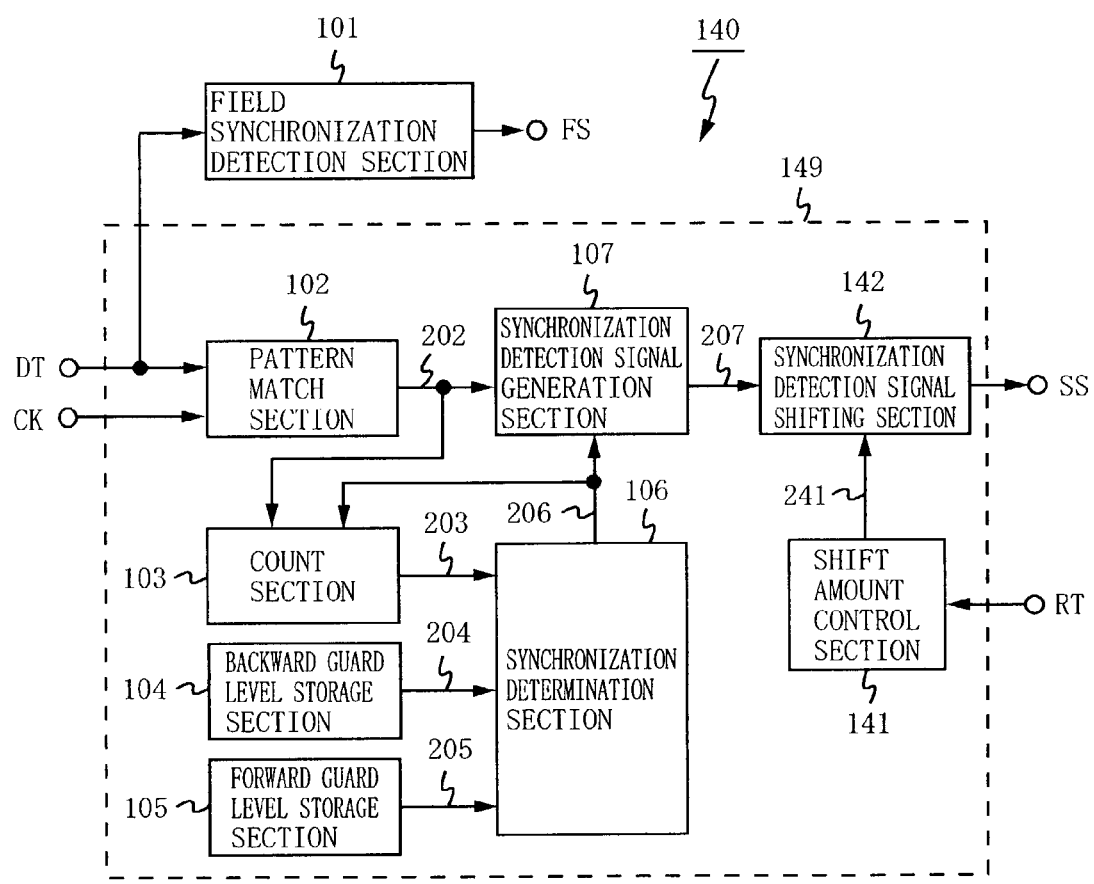
FIG. 13 is a block diagram illustrating a configuration of a synchronization detection device according to the fourth embodiment of the present invention.

FIG. 13 is a block diagram illustrating a configuration of a synchronization detection device according to the fourth embodiment of the present invention. A synchronization detection device 140 illustrated in FIG. 13 includes the field synchronization detection section 101, the pattern match section 102, the count section 103, the backward guard level storage section 104, the forward guard level storage section 105, the synchronization determination section 106, the synchronization detection signal generation section 107, a shift amount control section 141, and a synchronization detection signal shifting section 142. The synchronization detection device 140 is characterized in that the synchronization detection device 140 outputs the segment synchronization detection signal after shifting it in the time direction based on the error rate, which is inputted to the synchronization detection device 140. Elements of the present embodiment that are the same as those of the first embodiment are denoted by the same reference numerals and will not be described below.

The synchronization detection device 140 is provided in a VSB demodulation system, as is the synchronization detection device 110 according to the first embodiment. Thus, the synchronization detection device 140 is used in place of the synchronization detection device 110 in the VSB demodulation system illustrated in FIG. 2. Note however that in the present embodiment, a bit error rate RT for the output signal DO is supplied from the bit error rate measuring section 49 to the synchronization detection device 140. The error rate RT is an example of quality information that indicates the quality of the result of processing an input signal using the segment synchronization detection signal SS.

In FIG. 13, elements other than the field synchronization detection section 101 of the synchronization detection device 140 together form a segment synchronization detection section 149. The shift amount control section 141 and the synchronization detection signal shifting section 142 are elements that are characteristic of the synchronization detection device 140.

The shift amount control section 141 receives the error rate RT from the bit error rate measuring section 49. The shift amount control section 141 determines a shift amount 241 for the synchronization detection signal shifting section 142 based on the error rate RT. The synchronization detection signal shifting section 142 receives a segment synchronization detection signal 207 generated by the synchronization detection signal generation section 107, and the shift amount 241 determined by the shift amount control section 141. The synchronization detection signal shifting section 142 shifts the segment synchronization detection signal 207 forward or backward in the time direction by the shift amount 241, and outputs the result as the segment synchronization detection signal SS.

The shift amount control section 141 determines the shift amount 241 as follows, for example. As a first example, the shift amount control section 141 may receive the error rate RT at intervals of a predetermined period of time, and maintain the current shift amount 241 if the error rate RT is less than or equal to a predetermined value X, while changing the shift amount 241 by a predetermined method if the error rate RT exceeds the predetermined value X. Alternatively, as a second example, the shift amount control section 141 may sequentially select shift amounts that are available for selection, obtain the error rate after the passage of a predetermined period of time for each shift amount, and select the shift amount for which the obtained error rate is smallest as the new shift amount 241.

As illustrated above, the synchronization detection device according to the present embodiment is characterized in that the synchronization detection device outputs the segment synchronization detection signal after shifting it in the time direction based on the error rate, which is inputted to the synchronization detection device, and determines the shift amount of the segment synchronization detection signal so as to decrease the error rate obtained by the bit error rate measuring section 49. Therefore, with the synchronization detection device, it is possible to detect the segment synchronization signal with a high precision. Moreover, by using the synchronization detection device, it is possible to provide a VSB demodulation system having a high near-ghost interference removing capability.

(Fifth Embodiment)

Figure 14:
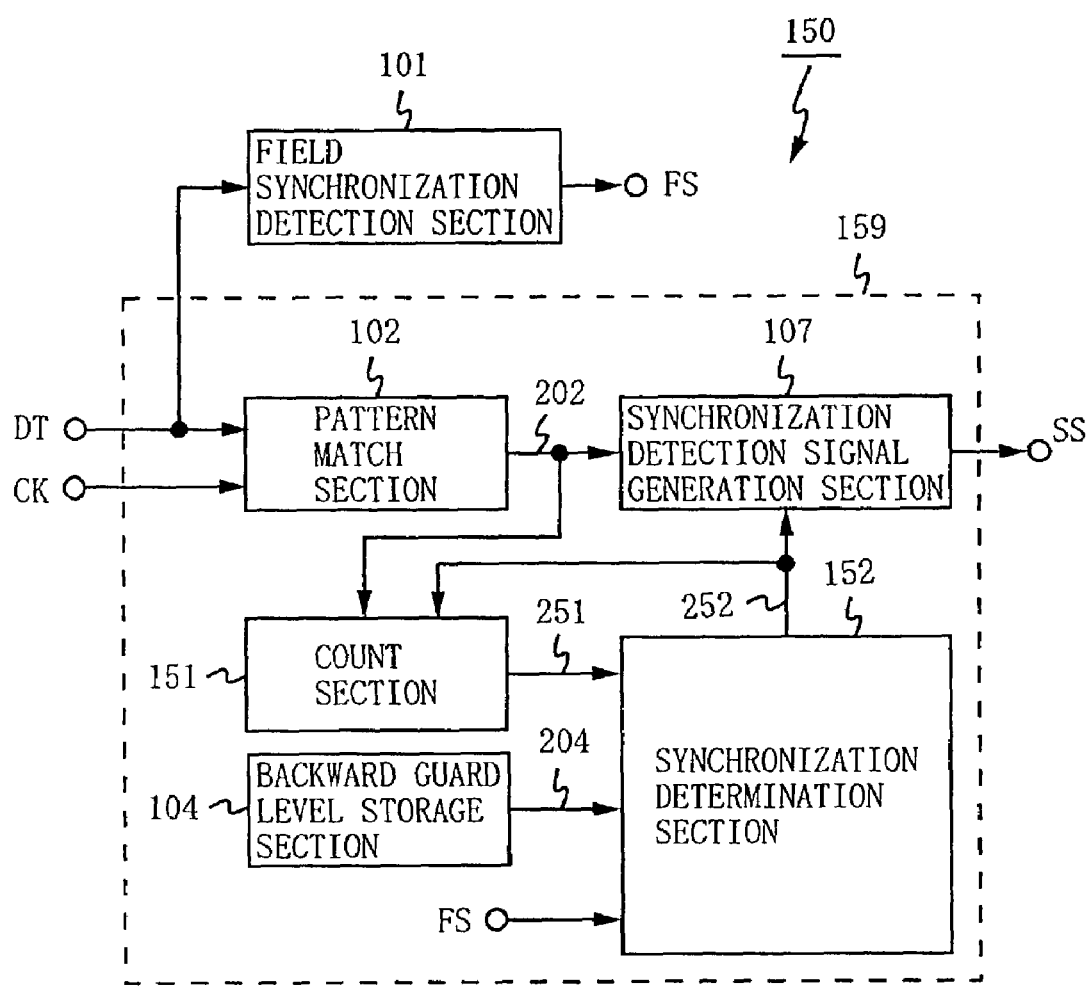
FIG. 14 is a block diagram illustrating a configuration of a synchronization detection device according to the fifth embodiment of the present invention.

FIG. 14 is a block diagram illustrating a configuration of a synchronization detection device according to the fifth embodiment of the present invention. A synchronization detection device 150 illustrated in FIG. 14 includes the field synchronization detection section 101, the pattern match section 102, a count section 151, the backward guard level storage section 104, a synchronization determination section 152, and the synchronization detection signal generation section 107. The synchronization detection device 150 is characterized in that once the segment synchronization is established, it maintains the state where the segment synchronization is established unless the field synchronization detection fails. Elements of the present embodiment that are the same as those of the first embodiment are denoted by the same reference numerals and will not be described below.

A synchronization detection device 150 is provided in a VSB demodulation system, as is the synchronization detection device 110 according to the first embodiment. Thus, the synchronization detection device 150 is used in place of the synchronization detection device 110 in the VSB demodulation system illustrated in FIG. 2.

In FIG. 14, elements other than the field synchronization detection section 101 together form a segment synchronization detection section 159. The count section 151 and the synchronization determination section 152 are elements that are characteristic of the synchronization detection device 150. Moreover, another characteristic of the synchronization detection device 150 is that it does not include a forward guard level storage section.

The count section 151 includes a counter and a control circuit for the counter. The count section 151 differs from the count section 103 according to the first to fourth embodiments in that it does not count the number of times a pattern match operation with the segment synchronization signal fails consecutively. Otherwise, the count section 151 is the same as the count section 103.

The synchronization determination section 152 receives the field synchronization detection signal FS outputted from the field synchronization detection section 101, in addition to a count value 251 from the count section 151 and the backward guard level 204. The synchronization determination section 152 determines whether it is a synchronization-established state or a synchronization-unestablished state based on these inputs, and outputs a synchronization state signal 252 indicating the determination result. More specifically, the synchronization determination section 152 determines the initial state to be a synchronization-unestablished state. The synchronization determination section 152 determines a transition to a synchronization-established state when the count value 203 becomes equal to or greater than the backward guard level 204 in a synchronization-unestablished state. Moreover, the synchronization determination section 152 determines a transition to a synchronization-unestablished state when the field synchronization detection section 101 fails to detect the field synchronization signal in a synchronization-established state. The synchronization determination section 152 determines that the field synchronization detection section 101 has failed to detect the field synchronization signal when the synchronization determination section 152 detects that the field synchronization detection signal FS is not being input with a predetermined cycle, for example. In this way, in the synchronization determination section 152, the forward guard level is infinite, and the state where the segment synchronization is established is maintained unless the field synchronization detection fails.

As illustrated above, in the synchronization detection device according to the present embodiment, once the segment synchronization is established, the state where the segment synchronization is established is maintained unless the detection of the field synchronization signal fails. Therefore, with the synchronization detection device, the segment synchronization, once established, is unlikely to be lost. In other words, the synchronization detection device has a high synchronization maintaining capability. Moreover, by using the synchronization detection device, it is possible to provide a VSB demodulation system having a high near-ghost interference removing capability.

INDUSTRIAL APPLICABILITY

As described above, the synchronization detection device according to the present invention is superior in terms of synchronization detecting capability and synchronization maintaining capability, and the synchronization detection device, when provided in a VSB demodulation system, makes it possible to properly perform synchronization detection and waveform equalization even when a near-ghost occurs to disturb the synchronization signal contained in the received signal.

The invention claimed is:

1. A synchronization detection device for detecting a synchronization signal from an input signal containing the synchronization signal, comprising:
   a sampling section that receives a clock signal and the input signal for sampling the input signal at one of a plurality of sample points that are present within one cycle of the clock signal;
   a pattern match section for checking whether or not an output signal of the sampling section contains a same signal pattern as that of the synchronization signal with a same cycle as that of the synchronization signal;
   a count section that receives a match result from the pattern match section for counting a number of times a pattern match operation succeeds consecutively in a synchronization-unestablished state and a number of times the pattern match operation fails consecutively in a synchronization-established state;
   a backward guard level storage section for storing a synchronization backward guard level;
   forward guard level storage section for storing a synchronization forward guard level;
   a synchronization determination section for determining operation in the synchronization-established state or the synchronization-unestablished state based on a count value of the count section, the backward guard level and the forward guard level; and
   a synchronization detection signal generation section for generating a synchronization detection signal at a timing point at which the pattern match operation is performed by the pattern match section in the synchronization-established state,
   wherein the sampling section switches sample points for sampling the input signal from one to another in the synchronization-unestablished state.

2. The synchronization detection device according to claim 1, wherein the sampling section includes:
   a clock multiplication section for multiplying the clock signal; and
   a switchable sampling section for sampling the input signal at a minimum interval at which the input signal changes by using the multiplied clock signal, while switching the sample points for sampling the input signal among a plurality of timing points defined by the multiplied clock signal in the synchronization-unestablished state.

3. The synchronization detection device according to claim 1, wherein the sampling section includes:
   a clock switching section for selectively outputting a non-inverted signal of the clock signal or an inverted signal thereof, the clock switching section switching signals to be output between the non-inverted signal of the clock signal and the inverted signal thereof in the synchronization-unestablished state; and
   a fixed sampling section for sampling the input signal at a minimum interval at which the input signal changes by using the output signal of the clock switching section.

4. The synchronization detection device according to claim 1, wherein the input signal is data having a frame structure compliant with the Advanced Television Systems Committee (ATSC) standard, and the synchronization signal is a segment synchronization signal compliant with the ATSC standard.

5. The synchronization detection device according to claim 1, further comprising:

a second pattern match section for receiving the clock signal and the input signal and checking whether or not the input signal contains a same signal pattern as that of the synchronization signal with a same cycle as that of the synchronization signal;

a second count section for receiving a match result from the second pattern match section and for counting a number of times a pattern match operation succeeds consecutively in the synchronization-unestablished state and a number of times the pattern match operation fails consecutively in the synchronization-established state;

a second backward guard level storage section for storing a second synchronization backward guard level;

a second forward guard level storage section for storing a second synchronization forward guard level;

a second synchronization determination section for determining operation in the synchronization-established state or the synchronization-unestablished state based on a count the second synchronization backward guard level and the second synchronization forward guard level;

a second synchronization detection signal generation section for generating a second synchronization detection signal at a timing point at which the pattern match operation is performed by the second pattern match section in the synchronization-established state; and a selector, wherein the selector receives the synchronization detection signal and the second synchronization detection signal, receives quality information indicating quality of the received signals, and if the quality of the input signal is higher than a predetermined reference, outputs the second synchronization detection signal.

6. The synchronization detection device according to claim 5, wherein the input signal is data having a frame structure compliant with the Advanced Television Systems Committee (ATSC) standard, the synchronization signal is a segment synchronization signal compliant with the ATSC standard, and the quality information indicates whether or not a near-ghost is occurring for the input signal.

7. A synchronization detection device for detecting a synchronization signal from an input signal containing the synchronization signal, comprising:

a pattern match section for checking whether or not the input signal contains a same signal pattern as that of the synchronization signal with a same cycle as that of the synchronization signal;

a count section that receives a match result from the pattern match section for counting a number of times a pattern match operation succeeds consecutively in a synchronization-unestablished state and a number of times the pattern match operation fails consecutively in a synchronization-established state;

a backward guard level storage section for storing a synchronization backward guard level;

a forward guard level storage section for storing a synchronization forward guard level;

a synchronization determination section for determining operation in the synchronization-established state or the synchronization-unestablished state based on a count value of the count section, the backward guard level and the forward guard level; and a synchronization detection signal generation section for generating a synchronization detection signal at a timing point at which the pattern match operation is performed by the pattern match section in the synchronization-established state, a shift amount control section that receives quality information that indicates a quality of a result of processing the input signal for obtaining a shift amount of the synchronization detection signal based on the quality information; and a synchronization detection signal shifting section for shifting the synchronization detection signal in a time direction according to the shift amount obtained by the shift amount control section.

8. The synchronization detection device according to claim 7, wherein the shift amount control section changes the shift amount of the synchronization detection signal if the quality of the result of processing the input signal is lower than a predetermined reference.

9. The synchronization detection device according to claim 7, wherein the shift amount control section determines the shift amount of the synchronization detection signal so as to optimize a quality of a result of processing the input signal.

10. The synchronization detection device according to claim 9, wherein the input signal is data having a frame structure compliant with the Advanced Television Systems Committee (ATSC) standard, and the synchronization signal is a segment synchronization signal compliant with the ATSC standard.

11. The synchronization detection device according to claim 10, wherein the quality information is error rate information for a signal that is obtained by performing a waveform equalization operation on the input signal using the synchronization detection signal.

12. A synchronization detection device for detecting a synchronization signal from an input signal containing the synchronization signal, comprising:

a pattern match section for checking whether or not the input signal contains a same signal pattern as that of the synchronization signal with a same cycle as that of the synchronization signal;

a count section that receives a match result from the pattern match section for counting a number of times a pattern match operation succeeds consecutively in a synchronization-unestablished state;

a backward guard level storage section for storing a synchronization backward guard level;

a long cycle synchronization detection section for detecting a long cycle synchronization signal contained in the input signal with a cycle longer than the synchronization signal;

a synchronization determination section for determining a transition to a synchronization-established state when a count value of the count section becomes equal to or greater than the backward guard level and for determining a transition to the synchronization-unestablished state when a synchronization detection operation fails in the long cycle synchronization detection section; and a synchronization detection signal generation section for generating a synchronization detection signal at a timing point at which the pattern match operation is performed by the pattern match section in the synchronization-established state.

13. The synchronization detection device according to claim 12, wherein the input signal is data having a frame structure compliant with the Advanced Television Systems Committee (ATSC) standard, the synchronization signal is a segment synchronization signal compliant with the ATSC standard, and the long cycle synchronization signal is a field synchronization signal compliant with the ATSC standard.

* * * * *